United States Patent
Nilsson et al.

(10) Patent No.: US 12,010,183 B2
(45) Date of Patent: Jun. 11, 2024

(54) IDENTIFICATION OF VEHICLE OCCUPANTS IN A VEHICLE

(71) Applicant: Ningbo Geely Automobile Research & Development Co., Ltd., Ningbo (CN)

(72) Inventors: Magnus Nilsson, Floda (SE); Jonathan Johansson, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 409 days.

(21) Appl. No.: 17/522,733

(22) Filed: Nov. 9, 2021

(65) Prior Publication Data
US 2022/0070274 A1   Mar. 3, 2022

Related U.S. Application Data

(63) Continuation of application No. PCT/CN2020/088908, filed on May 7, 2020.

(30) Foreign Application Priority Data

May 29, 2019 (EP) ..................................... 19177174

(51) Int. Cl.
*H04B 7/00* (2006.01)
*H04L 67/306* (2022.01)
(Continued)

(52) U.S. Cl.
CPC ............ *H04L 67/306* (2013.01); *H04W 4/48* (2018.02); *B60R 25/2081* (2013.01)

(58) Field of Classification Search
CPC .... H04L 67/306; H04W 4/48; B60R 25/2081; B60R 2325/101
(Continued)

(56) References Cited

U.S. PATENT DOCUMENTS 6,330,499 B1 * 12/2001 Chou ...................... G07C 5/08
                                                                701/32.7
7,474,199 B2 *  1/2009 Nakashima ........... B60R 25/245
                                                                340/10.5
(Continued)

FOREIGN PATENT DOCUMENTS

CN          201736927 U       2/2011
CN          104765598 A       7/2015
(Continued)

OTHER PUBLICATIONS

International Search Report from corresponding International Application No. PCT/CN2020/088908, dated Jul. 29, 2020, 2 pages.
(Continued)

*Primary Examiner* — Amancio Gonzalez
(74) *Attorney, Agent, or Firm* — Tucker Ellis LLP

(57) ABSTRACT

A method for managing vehicle occupant profiles includes detecting an unidentified radio device associated with a vehicle occupant, and localizing the radio device to a seat position. The method further includes updating an available vehicle occupant profile of the vehicle occupant with the detected and localized at least one unidentified radio device when other identified radio devices associated to the vehicle occupant are detected and localized to the seat position occupied by the vehicle occupant, establishing a new vehicle occupant profile of the vehicle occupant with the detected and localized at least one unidentified radio device when no other identified radio devices associated to the vehicle occupant are detected and localized to the seat position occupied by the vehicle occupant, and assigning a probability value to the updated or established vehicle occupant profile.

16 Claims, 4 Drawing Sheets

(51) Int. Cl.
*H04W 4/48* (2018.01)
*B60R 25/20* (2013.01)
(58) Field of Classification Search
USPC ..................................................... 370/310
See application file for complete search history.

(56) References Cited

U.S. PATENT DOCUMENTS

| | | | | |
|---|---|---|---|---|
| 7,934,763 | B2 * | 5/2011 | Mabuchi | B60N 2/0292 |
| | | | | 297/344.21 |
| 8,264,324 | B2 * | 9/2012 | Tsuchiya | B60R 25/245 |
| | | | | 340/426.36 |
| 8,320,893 | B2 * | 11/2012 | Suurmeyer | H04M 3/56 |
| | | | | 340/425.5 |
| 8,626,152 | B2 * | 1/2014 | Farrell | H04W 76/10 |
| | | | | 340/904 |
| 8,761,758 | B2 * | 6/2014 | Farrell | G08G 1/205 |
| | | | | 340/904 |
| 8,768,345 | B2 * | 7/2014 | Farrell | H04W 4/12 |
| | | | | 340/904 |
| 8,768,567 | B2 * | 7/2014 | Diab | B60W 50/00 |
| | | | | 709/224 |
| 8,774,794 | B2 * | 7/2014 | Farrell | H04W 4/12 |
| | | | | 340/904 |
| 8,798,616 | B2 * | 8/2014 | Farrell | H04M 1/6091 |
| | | | | 340/904 |
| 8,818,358 | B2 * | 8/2014 | Farrell | G08G 1/205 |
| | | | | 340/904 |
| 8,892,090 | B2 * | 11/2014 | Gee | H04W 4/40 |
| | | | | 455/575.9 |
| 9,047,783 | B2 * | 6/2015 | Farrell | H04L 67/12 |
| 9,272,689 | B2 * | 3/2016 | Fung | G07C 9/37 |
| 9,348,492 | B1 * | 5/2016 | Penilla | G06F 3/04842 |
| 9,397,762 | B2 * | 7/2016 | Magarida | H04W 4/46 |
| 9,401,978 | B2 * | 7/2016 | Farrell | H04W 76/10 |
| 9,420,958 | B2 * | 8/2016 | Fung | A61B 5/7239 |
| 9,463,805 | B2 * | 10/2016 | Kirsch | A61B 5/6893 |
| 9,478,848 | B2 * | 10/2016 | Nagata | H01Q 21/28 |
| 9,509,820 | B2 * | 11/2016 | Gopinath | H04W 8/005 |
| 9,549,425 | B2 * | 1/2017 | Farrell | H04W 76/14 |
| 9,628,599 | B2 * | 4/2017 | Farrell | H04W 76/10 |
| 9,756,668 | B2 * | 9/2017 | Farrell | H04W 4/027 |
| 9,760,702 | B1 * | 9/2017 | Kursun | G06F 21/34 |
| 9,973,608 | B2 * | 5/2018 | Farrell | H04W 4/12 |
| 10,065,657 | B2 * | 9/2018 | Porembski | H04L 67/125 |
| 10,200,520 | B2 * | 2/2019 | Farrell | H04M 1/6091 |
| 10,220,854 | B2 * | 3/2019 | Chen | B60R 16/037 |
| 10,580,084 | B1 * | 3/2020 | Davis | H04W 4/20 |
| 10,894,476 | B2 * | 1/2021 | Johnson | B60K 35/22 |
| 10,897,650 | B2 * | 1/2021 | el Kaliouby | A61B 5/18 |
| 10,922,567 | B2 * | 2/2021 | Mahmoud | A61B 5/163 |
| 10,974,717 | B2 * | 4/2021 | Golgiri | H04W 4/023 |
| 11,006,257 | B2 * | 5/2021 | Cohen | H04W 4/026 |
| 11,052,786 | B2 * | 7/2021 | Ajisaka | B60N 2/14 |
| 11,292,477 | B2 * | 4/2022 | el Kaliouby | A61B 5/4803 |
| 11,294,551 | B2 * | 4/2022 | Penilla | H04W 12/06 |
| 11,361,388 | B1 * | 6/2022 | Floyd | G06Q 40/08 |
| 11,729,580 | B2 * | 8/2023 | Thomas | B60K 35/10 |
| | | | | 455/418 |
| 11,734,401 | B1 * | 8/2023 | Krebs | H04W 12/06 |
| | | | | 713/186 |
| 2003/0224840 | A1 * | 12/2003 | Frank | H04M 1/6091 |
| | | | | 455/575.9 |
| 2006/0123053 | A1 * | 6/2006 | Scannell | G06F 16/9577 |
| 2007/0093200 | A1 * | 4/2007 | Dobosz | H04B 7/18565 |
| | | | | 455/3.02 |
| 2009/0088141 | A1 * | 4/2009 | Suurmeyer | H04M 3/56 |
| | | | | 455/416 |
| 2009/0197593 | A1 * | 8/2009 | Farrell | G08G 1/205 |
| | | | | 455/426.1 |
| 2011/0143668 | A1 * | 6/2011 | Farrell | H04W 76/10 |
| | | | | 455/41.2 |
| 2011/0143669 | A1 * | 6/2011 | Farrell | H04M 1/6091 |
| | | | | 455/41.2 |
| 2011/0143670 | A1 * | 6/2011 | Farrell | H04W 4/12 |
| | | | | 455/41.2 |
| 2011/0143750 | A1 * | 6/2011 | Farrell | H04W 76/10 |
| | | | | 455/426.1 |
| 2011/0143751 | A1 * | 6/2011 | Farrell | H04M 1/6091 |
| | | | | 455/426.1 |
| 2012/0231821 | A1 * | 9/2012 | Swanson | H04W 4/14 |
| | | | | 455/466 |
| 2012/0252431 | A1 * | 10/2012 | Gee | H04W 4/90 |
| | | | | 455/422.1 |
| 2012/0252475 | A1 * | 10/2012 | Farrell | G08G 1/205 |
| | | | | 455/450 |
| 2012/0253551 | A1 * | 10/2012 | Halimi | H04M 3/4878 |
| | | | | 701/1 |
| 2013/0006769 | A1 * | 1/2013 | Schalk | G06Q 30/0266 |
| | | | | 705/14.62 |
| 2014/0248861 | A1 * | 9/2014 | Farrell | H04W 76/10 |
| | | | | 455/414.1 |
| 2015/0149042 | A1 | 5/2015 | Cooper | |
| 2015/0237661 | A1 * | 8/2015 | Farrell | H04W 76/11 |
| | | | | 455/41.2 |
| 2015/0373176 | A1 * | 12/2015 | Farrell | G08G 1/205 |
| | | | | 455/414.1 |
| 2016/0227375 | A1 * | 8/2016 | Farrell | H04W 4/027 |
| 2016/0288796 | A1 | 10/2016 | Yuan | |
| 2017/0180529 | A1 * | 6/2017 | Farrell | H04M 1/6091 |
| 2017/0339529 | A1 | 11/2017 | Buttolo | |
| 2018/0013873 | A1 * | 1/2018 | Farrell | H04W 76/10 |
| 2018/0052494 | A1 | 2/2018 | Coburn | |
| 2018/0227405 | A1 * | 8/2018 | Farrell | G08G 1/205 |
| 2019/0279180 | A1 * | 9/2019 | Aich | G06Q 50/40 |
| 2021/0209566 | A1 * | 7/2021 | Ketharaju | G06Q 20/405 |
| 2021/0223051 | A1 * | 7/2021 | Hochberg | G06V 20/593 |
| 2023/0087506 | A1 * | 3/2023 | Koral | H04W 36/32 |
| | | | | 455/418 |

FOREIGN PATENT DOCUMENTS

| | | |
|---|---|---|
| CN | 108248549 A | 7/2018 |
| CN | 108688680 A | 10/2018 |
| CN | 109067745 A | 12/2018 |
| DE | 102017200644 A1 | 7/2018 |
| WO | 2018162155 A1 | 9/2018 |

OTHER PUBLICATIONS

Extended European Search Report from corresponding European Application No. 19177174.0 dated Dec. 9, 2019, 5 pages.

* cited by examiner

IDENTIFICATION OF VEHICLE OCCUPANTS IN A VEHICLE

RELATED APPLICATION DATA

This application is a continuation of International Patent Application No. PCT/CN2020/088908, filed May 7, 2020, which claims the benefit of European Patent Application No. 19177174.0, filed May 29, 2019, the disclosures of which are incorporated herein by reference in their entireties.

TECHNICAL FIELD

The present disclosure relates generally to the field of identification of vehicle occupants in a vehicle. More particularly, it relates to managing vehicle occupant profiles in a vehicle wherein a vehicle occupant is associated with at least one radio device for verification against a vehicle occupant profile.

BACKGROUND

It is known to utilize selected tokens for identification of vehicle occupants in a vehicle for governing one or more vehicle functions.

A drawback of known methods for identification of vehicle occupants in a vehicle is that the tokens need be selected, paired and confirmed with a vehicle occupant profile for identification purposes.

Therefore, there is a need for alternative approaches to identifying vehicle occupants in a vehicle.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

An object of some embodiments is to provide alternative approaches to identifying vehicle occupants in a vehicle.

According to a first aspect, this is achieved by a method for managing vehicle occupant profiles in a vehicle comprising at least one transceiver for receiving radio signals wherein a vehicle occupant is associated with at least one unidentified radio device for verification against a vehicle occupant profile.

The method comprises detecting, by the at least one transceiver, the at least one unidentified radio device associated with the vehicle occupant and localizing, by at least one sensor in the vehicle, the detected at least one unidentified radio device to a seat position in the vehicle occupied by the vehicle occupant of which the detected at least one unidentified radio device is associated with.

The method further comprises updating an available vehicle occupant profile of the vehicle occupant with the detected and localized at least one unidentified radio device when other identified radio devices associated to the vehicle occupant are detected and localized to the seat position occupied by the vehicle occupant, establishing a new vehicle occupant profile of the vehicle occupant with the detected and localized at least one unidentified radio device when no other identified radio devices associated to the vehicle occupant are detected and localized to the seat position occupied by the vehicle occupant, and assigning a probability value to the updated or established vehicle occupant profile.

An advantage of some embodiments is that a method for managing vehicle occupant profiles in a vehicle is provided.

Another advantage of some embodiments is that an automatic method for identification of a vehicle occupant is provided by the radio devices associated to the vehicle occupant without the vehicle occupant selecting, pairing and confirming a selected token.

In some embodiments, the method further comprises determining the probability value of the vehicle occupant profile based on the number of times a collection of radio devices associated to the vehicle occupant has been detected and localized.

An advantage of some embodiments is that a repeated detection and localization of a collection of radio devices provides an increasingly accurate and reliable vehicle occupant profile.

In some embodiments, the probability value comprises an indication that the collection of radio devices associated to the vehicle occupant is accurately identified.

An advantage of some embodiments is the provision of an indication of how accurate and reliable a vehicle occupant profile is.

In some embodiments, the vehicle occupant profile comprises an authorization level based on the probability value assigned to the vehicle occupant profile.

Furthermore, in some embodiments, the vehicle occupant profile comprises an authorization level based on the collection of radio devices assigned to the vehicle occupant profile.

Furthermore, in some embodiments, the vehicle occupant profile comprises an authorization level based on the collection of radio devices and the probability value assigned to the vehicle occupant profile.

An advantage of some embodiments is that different vehicle functions may be enabled based on the authorization level so that accurate and reliable access to different vehicle functions may be provided.

In some embodiments, the association of the radio device to the vehicle occupant comprises the radio device being any one of body integrated device, body worn device, device carried in garments, and device being in the vicinity of the vehicle occupant.

An advantage of some embodiments is that the radio devices are worn or at hand, i.e. associated to a vehicle occupant, at all times or a majority of the time enabling an accurate and convenient method for identification.

In some embodiments, the radio device comprises any one of a wireless communication device, tag, access card, and key band.

An advantage of some embodiments is that a wide variety of radio devices may be used for identification.

In some embodiments, the radio device is capable of providing a unique identification signal or the vehicle is capable of distinguishing a signal from the radio device.

An advantage of some embodiments is that a radio device may be identified regardless if the radio device is capable of providing a unique identification signal or if the radio device is merely capable of a non-unique identification signal which provides for less requirements on the radio devices that may be used for identification.

In some embodiments, the sensor comprises any one of a seat sensor, seat belt sensor, biometric sensor, and camera sensor.

An advantage of some embodiments is that the seating position of the vehicle occupant may be detected in a variety of ways.

A second aspect is a method for updating a vehicle occupant profile of a vehicle occupant wherein the vehicle occupant profile comprises information regarding the vehicle occupant and at least one identified radio device.

The method comprises detecting, by at least one transceiver in a vehicle, at least one unidentified radio device, and updating the vehicle occupant profile of the vehicle occupant with the detected at least one unidentified radio device when the at least one identified radio device of which information is comprised in the vehicle occupant profile also is detected by the at least one transceiver.

An advantage of some embodiments is that a method for updating a vehicle occupant profile is provided.

Another advantage of some embodiments is that an automatic updating of a vehicle occupant profile is provided without the vehicle occupant selecting, pairing and confirming a selected token.

A third aspect is a method for establishing a vehicle occupant profile of a vehicle occupant wherein the vehicle occupant profile comprises information regarding the vehicle occupant.

The method comprises detecting, by at least one transceiver in a vehicle, at least one unidentified radio device, and establishing the vehicle occupant profile of the vehicle occupant with the detected at least one unidentified radio device when no other identified radio devices are detected by the at least one transceiver.

An advantage of some embodiments is that a method for establishing a vehicle occupant profile is provided.

Another advantage of some embodiments is that an automatic establishing of a vehicle occupant profile is provided without the vehicle occupant selecting, pairing and confirming a selected token.

In some embodiments, the updating and/or the establishing further comprises requesting a control unit for addition of the detected at least one unidentified radio device to the vehicle occupant profile.

An advantage of some embodiments is that that the at least one unidentified radio device is added to the vehicle occupant profile.

In some embodiments, the method further comprises determining a position of the at least one unidentified radio relative to the vehicle based on signals received by the at least one transceiver.

In some embodiments, the method further comprises determining a position of the at least one unidentified radio relative to the vehicle based on signals received by the at least one transceiver and vehicle data for determining vehicle movement.

An advantage of some embodiments is that a position, relative to the vehicle, of the at least one unidentified radio device may be determined to allow improved differentiation from radio devices that are not relevant for the method, e.g. radio devices associated with infrastructure or pedestrians that the vehicle is passing.

In some embodiments, the position may be determined based on signal characteristics such as amplitude determined by at least one transceiver. In other words, a characteristic such as the amplitude may indicate relative distance to the at least one transceiver.

An advantage of some embodiments is that the method further comprises that the position is based on vehicle data for determining vehicle movement and may be that a further selection criteria may be added to allow to further improve differentiation from radio devices that are not relevant for the method.

In some embodiments, the method further comprises determining a position of the at least one unidentified radio device in the vehicle by at least two transceivers. By using at least two transceivers a position may for example be determined by comparing measured amplitude received from the at least one radio device and establishing a possible position of the at least one unidentified radio device depending on a known relative vehicular position of the at least two transceivers.

An advantage is that a position of the at least one unidentified radio device is determined by at least two transceivers.

A fourth aspect is a computer program product comprising a non-transitory computer readable medium, having thereon a computer program comprising program instructions. The computer program is loadable into a data processing unit and configured to cause execution of the method according to the first, second, and third aspects when the computer program is run by the data processing unit.

A fifth aspect is an arrangement for managing vehicle occupant profiles in a vehicle comprising at least one transceiver for receiving radio signals wherein a vehicle occupant is associated with at least one unidentified radio device for verification against a vehicle occupant profile.

The arrangement comprises a memory comprising executable instructions, one or more processors configured to communicate with the memory wherein the one or more processors are configured to cause the arrangement to detect, by the at least one transceiver, the at least one unidentified radio device associated with the vehicle occupant and localize, by at least one sensor in the vehicle, the detected at least one unidentified radio device to a seat position in the vehicle occupied by the vehicle occupant of which the detected at least one unidentified radio device is associated with.

The one or more processors are further configured to cause the arrangement to update an available vehicle occupant profile of the vehicle occupant with the detected and localized at least one unidentified radio device when other identified radio devices associated to the vehicle occupant are detected and localized to the seat position occupied by the vehicle occupant, establish a new vehicle occupant profile of the vehicle occupant with the detected and localized at least one unidentified radio device when no other identified radio devices associated to the vehicle occupant are detected and localized to the seat position occupied by the vehicle occupant, and assign a probability value to the updated or established vehicle occupant profile.

An advantage of some embodiments is that an arrangement for managing vehicle occupant profiles in a vehicle is provided.

Another advantage of some embodiments is that an arrangement for automatic identification of a vehicle occupant by the radio devices associated to the vehicle occupant is provided without the vehicle occupant selecting, pairing and confirming a selected token.

In some embodiments, the one or more processors are configured to further cause the arrangement to determine the probability value of the vehicle occupant profile based on the number of times a collection of radio devices associated to the vehicle occupant has been detected and localized.

An advantage of some embodiments is that a repeated detection and localization of a collection of radio devices provides an increasingly accurate and reliable vehicle occupant profile.

In some embodiments, the arrangement further comprises a vehicle occupant profile system comprising at least one vehicle occupant profile wherein the vehicle occupant profile comprises information regarding a vehicle occupant, at least one identified radio device, and a probability value and wherein the at least one identified radio device makes up a collection or swarm of radio devices associated to the vehicle occupant for verification against the vehicle occupant profile.

Alternatively or additionally, the at least one radio identified device may comprise a plurality of radio devices making up a swarm of radio devices.

An advantage of some embodiments is that a vehicle occupant system is provided.

A sixth aspect is a vehicle comprising the arrangement according to the third aspect.

In some embodiments, the vehicle comprises a plurality of transceivers and sensors configured to perform the method according to the first aspect.

An advantage of some embodiments is that the plurality of transceivers and sensors provide the ability to detect and localize radio devices anywhere in the vehicle.

A seventh aspect is a system for managing vehicle occupant profiles in a vehicle comprising at least one transceiver for receiving radio signals wherein a vehicle occupant is associated with at least one unidentified radio device for verification against a vehicle occupant profile.

The system comprises a detecting module configured to detect, by the at least one transceiver, the at least one unidentified radio device associated with the vehicle occupant, and a localizing module configured to localize, by at least one sensor in the vehicle, the detected at least one unidentified radio device to a seat position in the vehicle occupied by the vehicle occupant of which the detected at least one unidentified radio device is associated with.

The system further comprises an updating module configured to update an available vehicle occupant profile of the vehicle occupant with the detected and localized at least one unidentified radio device when other identified radio devices associated to the vehicle occupant are detected and localized to the seat position occupied by the vehicle occupant, an establishing module configured to establish a new vehicle occupant profile of the vehicle occupant with the detected and localized at least one unidentified radio device when no other identified radio devices associated to the vehicle occupant are detected and localized to the seat position occupied by the vehicle occupant, and an assigning module configured to assign a probability value to the updated or established vehicle occupant profile.

An advantage of some embodiments is that a system for managing vehicle occupant profiles in a vehicle is provided.

Another advantage of some embodiments is that a system for automatic identification of a vehicle occupant by the radio devices associated to the vehicle occupant is provided without the vehicle occupant selecting, pairing and confirming a selected token.

In some embodiments, the system further comprises a determining module configured to determine the probability value of the vehicle occupant profile based on the number of times a collection of radio devices associated to the vehicle occupant has been detected and localized.

An advantage of some embodiments is that a repeated detection and localization of a collection of radio devices provides an increasingly accurate and reliable vehicle occupant profile.

Any of the above aspects may additionally have features identical with or corresponding to any of the various features as explained above for any of the other aspects.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to identifying vehicle occupants in a vehicle are provided.

Vehicle occupants usually carry many different kinds of radio devices such as mobile communication device, tags, access cards, and key band on them e.g. worn in clothing, hand, wrist or elsewhere on the body, wherein the radio devices are capable of transmitting and receiving radio signals.

Figure 1:
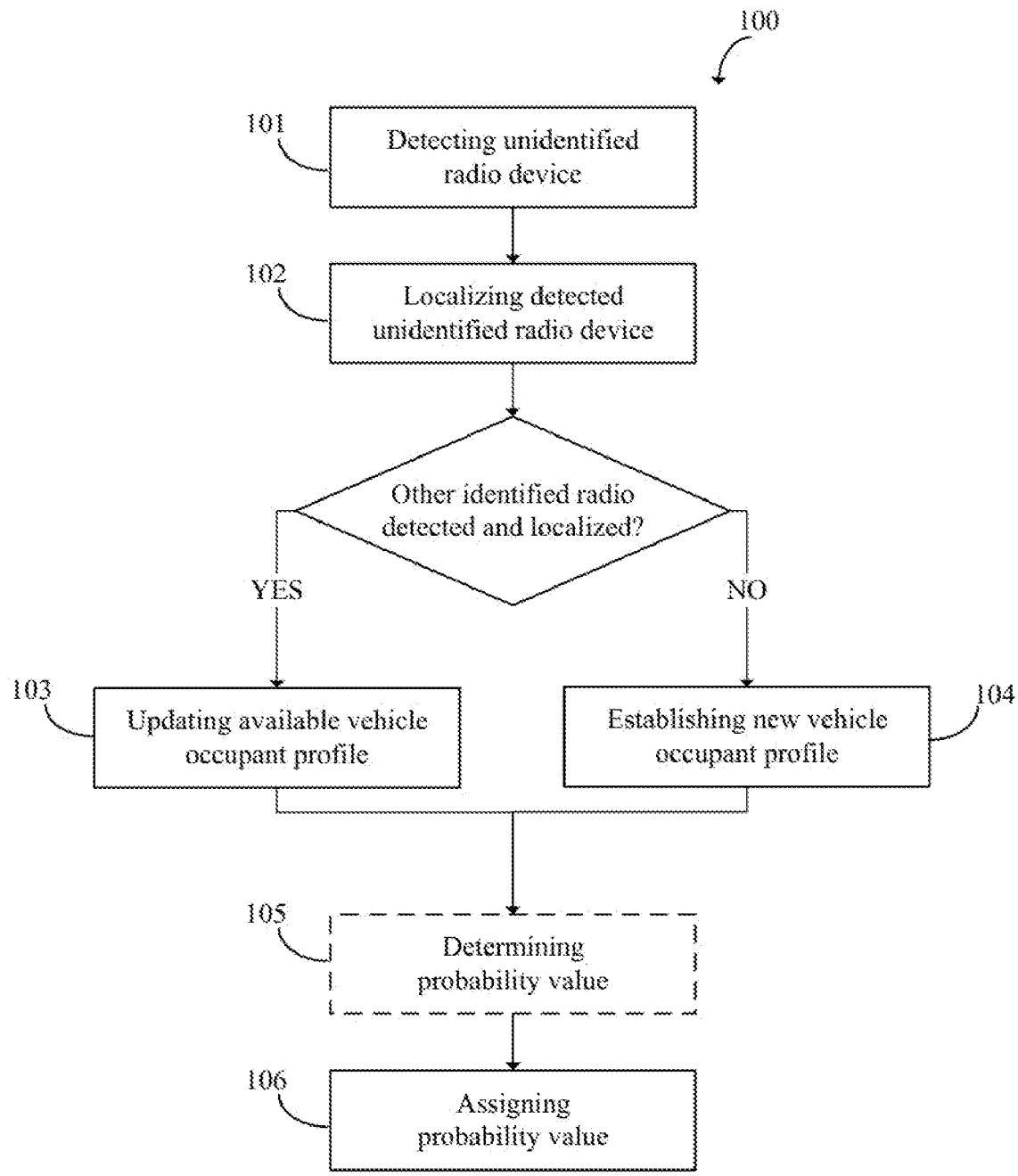
FIG. 1 is flowchart illustrating example method steps according to some embodiments.

FIG. 1 is a flowchart illustrating example method steps according to some embodiments. The method 100 is for managing vehicle occupant profiles in a vehicle. Thus, the method 100 may, for example, be performed by a system 300 of FIG. 3 or an arrangement 400 of FIG. 4 or a computer program 510 of FIG. 5.

The method 100 is for managing vehicle occupant profiles in a vehicle comprising at least one transceiver for receiving radio signals wherein a vehicle occupant is associated with at least one unidentified radio device for verification against a vehicle occupant profile.

In step 101, the at least one unidentified radio device associated with the vehicle occupant is detected by the at least one transceiver.

For example, the unidentified radio device may comprise an unknown device or a third party device which has not been identified and thereby not been selected, paired or confirmed for identification.

In some embodiments, the radio device comprises any one of a wireless communication device, tag, access card, and key band.

Other radio devices associated to a vehicle occupant which are capable of being detected by a transceiver may also be used accordingly.

In some embodiments, the association of the radio device to the vehicle occupant comprises the radio device being any one of body integrated device, body worn device, device carried in garments, and device being in the vicinity of the vehicle occupant.

Other associations of radio devices to a vehicle occupant are possible as long as they are detectable and localizable accordingly.

For example, the association of the radio device with the vehicle occupant may comprise the radio device(s) being in a bag/handbag/suitcase in proximity of the vehicle occupant.

In some embodiments, the radio device is capable of providing a unique identification signal or wherein the vehicle is capable of distinguishing a signal from the radio device.

For example, the at least one transceiver may receive a unique identification signal from an unidentified radio device.

For example, the at least one transceiver may receive a signal from an unidentified radio device that may not be intended as an identification signal but where the vehicle is capable of distinguishing it from other signals. A signal from a radio device which is not intended as an identification signal is e.g. a Bluetooth MAC address provided by a Bluetooth radio device which can be used for identification or the detection of morse operator from patterns of key strokes detectable in the waveform from radio devices as the waveforms conform to specifications e.g. a pulse should be between 5 and 8 ms long but one radio device always gives 6 ms pulses and the other gives 8 ms pulses.

In step 102, the detected at least one unidentified radio device is localized by at least one sensor in the vehicle to a seat position in the vehicle occupied by the vehicle occupant of which the detected at least one unidentified radio device is associated with.

In some embodiments, the sensor comprises any one of a seat sensor, seat belt sensor, biometric sensor, and camera sensor.

For example, a vehicle occupant occupying a certain seat position in the vehicle while carrying a radio device may be localized to the certain seat position by the at least one sensor e.g. a seat sensor or seat belt sensor or any other type of sensor capable of localizing a vehicle occupant in a vehicle.

In step 103, an available vehicle occupant profile of the vehicle occupant is updated with the detected and localized at least one unidentified radio device when other identified radio devices associated to the vehicle occupant are detected and localized to the seat position occupied by the vehicle occupant.

For example, an existing vehicle occupant profile of the vehicle occupant may comprise vehicle occupant credentials e.g. vehicle occupant ID obtained from identified radio devices, number and type of identified radio devices, a probability value, and an authorization level.

Alternatively, the existing vehicle occupant profile of the vehicle occupant may be updated by detecting, by the at least one transceiver in the vehicle, the at least one unidentified radio device, and updating the vehicle occupant profile of the vehicle occupant with the detected at least one unidentified radio device when the at least one identified radio device of which information is comprised in the vehicle occupant profile also is detected by the at least one transceiver.

In step 104, a new vehicle occupant profile of the vehicle occupant is established with the detected and localized at least one unidentified radio device when no other identified radio devices associated to the vehicle occupant are detected and localized to the seat position occupied by the vehicle occupant.

For example, a new vehicle occupant profile of the vehicle occupant may comprise a vehicle occupant ID, at least one identified radio device, and a default probability value.

Alternatively, the new vehicle occupant profile of the vehicle occupant may be established by detecting, by the at least one transceiver in the vehicle, the at least one unidentified radio device, and establishing the vehicle occupant profile of the vehicle occupant with the detected at least one unidentified radio device when no other identified radio devices are detected by the at least one transceiver.

In some embodiments, the updating according to e.g. step 103 and/or the establishing according to e.g. step 104 further comprises requesting a control unit for addition of the detected at least one unidentified radio device to the vehicle occupant profile.

In some embodiments, the method further comprises determining a position of the at least one unidentified radio device in the vehicle by at least two transceivers.

For example, the determining the position of the at least one unidentified radio device in the vehicle by the at least two transceivers may be performed via triangulation, detection of signal intensity and/or a detection of first/second/third etc. seated vehicle occupant, or biometric data etc. In step 105, in some embodiments, the probability value of the vehicle occupant profile is determined based on the number of times a collection of radio devices associated to the vehicle occupant has been detected and localized.

In step 106, a probability value is assigned to the updated or established vehicle occupant profile.

In some embodiments, the probability value comprises an indication that the collection of radio devices associated to the vehicle occupant is accurately identified.

For example, the probability value may comprise a numerical value indicating the level of accuracy and reliability of the vehicle occupant profile e.g. 0.1 as a default value when establishing a new vehicle occupant profile with a newly identified radio device associated to the vehicle occupant and 1 when the collection of identified radio devices associated to the vehicle occupant has been detected and localized a certain number of times.

In some embodiments, the vehicle occupant profile comprises an authorization level based on the probability value assigned to the vehicle occupant profile.

For example, the authorization level may comprise authorization for the vehicle occupant to perform certain tasks in the vehicle such as open the trunk, the doors or even drive the vehicle. There can be a probability value, i.e. probability threshold, assigned to the authorization level as well, so that the vehicle needs a higher probability of accurate identification to drive than to open the trunk.

An example of above method steps follows:

A collection of non-identified radio devices A, B, C are detected and localized to a certain seat position in the vehicle in a mode wherein no one can enter or exit the vehicle e.g. if the doors of the vehicle are closed and/or if the vehicle is in motion.

As all the detected radio devices are un-identified a new vehicle occupant profile is established with the lowest authorization level. The lowest authorization level may comprise only seat settings for the vehicle occupant which are stored in the newly established vehicle occupant profile.

The collection of identified radio devices A, B, C, i.e. a swarm of identified radio devices, may be detected by the at least one transceiver in the vehicle as well as one un-identified device D.

After repeated detections of D in connection with a significant sub-set of the swarm A, B, C e.g. B and C, the swarm is considered to comprise A, B, C, and D. The swarm may still have the lowest authorization level as explained above. Accordingly, a significant subset of the swarm A, B, C, D e.g. B, C, and D may suffice to verify the vehicle occupant profile.

The swarm comprising A, B, C, and D may further comprise a radio device being an authorized token E. The authorized token E may comprise a mobile communication device, e.g. a smart phone with a lock-app installed in it, or a key fob.

The same procedure as explained above is performed for the detected and localized radio devices so that the swarm comprises A, B, C, D, and E. Accordingly, the subset A, B, C, D of the swarm A, B, C, D, E may be authorized to perform the same actions as the authorized token E i.e. the subset A, B, C, D may have the same authorization level as E of the swarm A, B, C, D, E.

Figure 2:
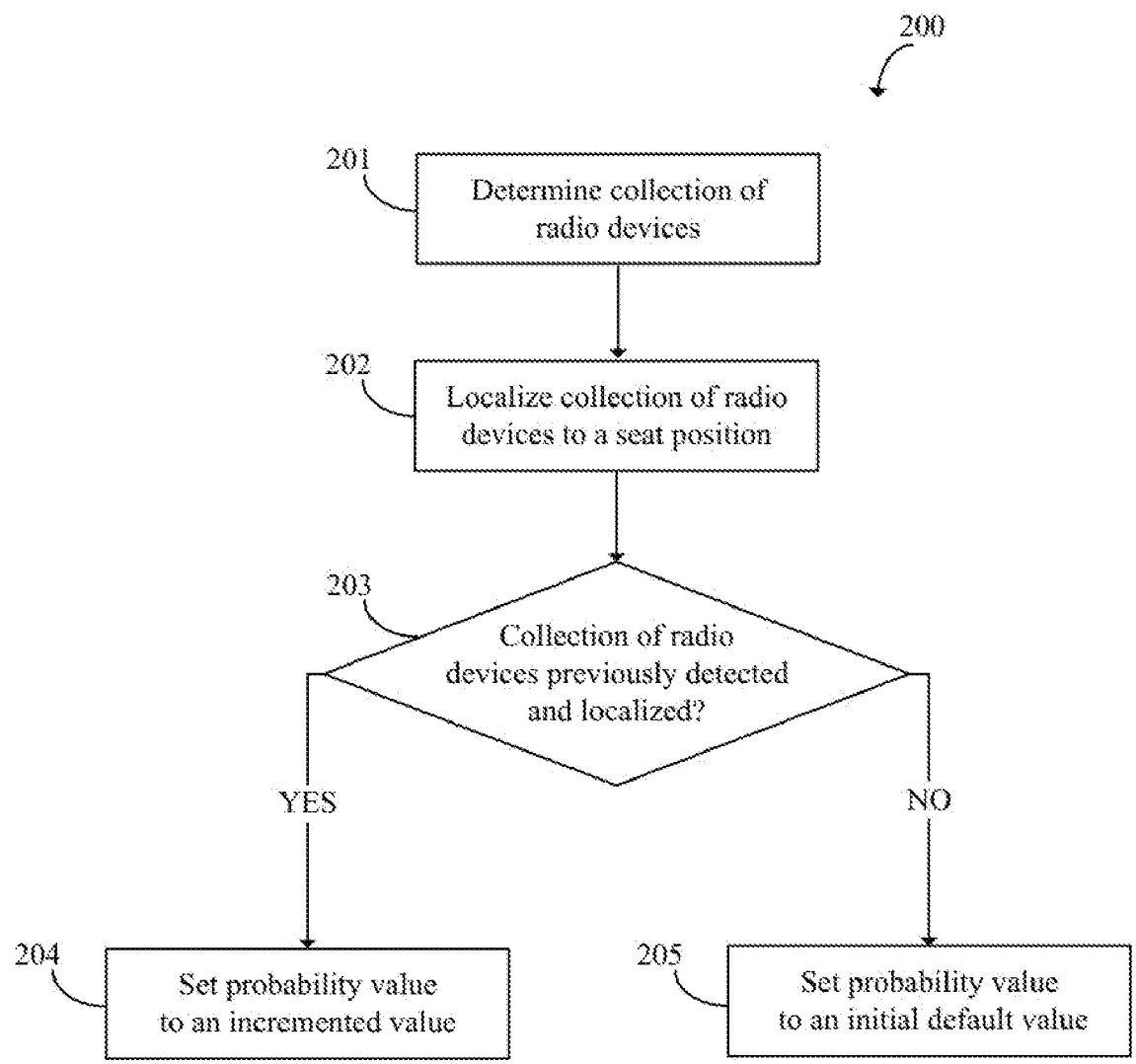
FIG. 2 is flowchart illustrating example method steps according to some embodiments.

A less significant subset of the swarm may be authorized to perform fewer actions than a more significant subset of the swarm. For example, the less significant subset A,B can lock the vehicle while the more significant subset A,B,C can unlock the vehicle etc. FIG. 2 is a flowchart illustrating example method steps according to some embodiments. The method 200 is for managing vehicle occupant profiles in a vehicle. Thus, the method 200 may, for example, be performed by an system 300 of FIG. 3 or an arrangement 400 of FIG. 4 or a computer program 510 of FIG. 5.

In step 201, a collection of radio devices is detected and determined.

For example, the collection of radio devices may comprise a swarm of radio devices of which collection/swarm of radio devices, i.e. the swarm being a collection of radio devices providing a unique identity for the vehicle occupant, enables a type of digital fingerprinting for a vehicle occupant associated to the collection/swarm of radio devices. This type of digital fingerprinting enables an accurate and reliable identification method without the vehicle occupant selecting, pairing and confirming a selected token.

In step 202, the collection of radio devices is localized to a seat position occupied by the vehicle occupant of which the collection of radio devices is associated with.

For example, the collection of radio devices may be localized to a certain seat position occupied by the vehicle occupant in the vehicle while the vehicle occupant carrying the collection of radio devices by the at least one sensor e.g. a seat sensor or seat belt sensor or any other type of sensor capable of localizing a vehicle occupant in a vehicle.

In step 203, the collection of radio devices is assessed if it has been previously detected and localized.

In step 204, when the collection of radio devices is assessed as having been previously detected and localized, setting a probability value to an incremented value.

For example, the probability value may start at a value of 0.1 and may be incremented by +0.1 up until a maximum value of e.g. 1.

In step 205, when the collection of radio devices is assessed as not having been previously detected and localized, setting a probability value to an initial default value.

For example, the probability value may be set to a default value of 0.1.

Figure 3:
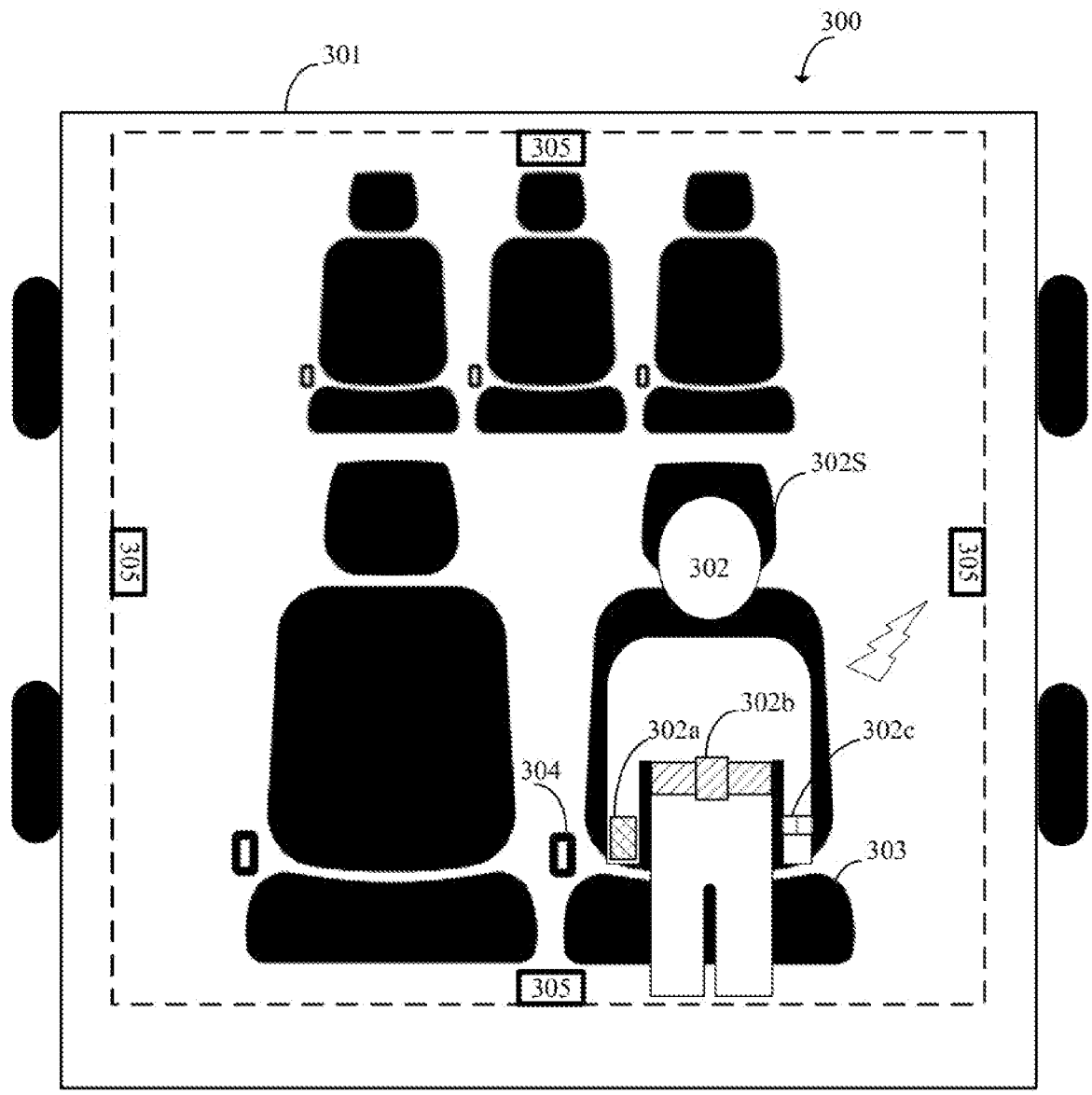
FIG. 3 is a schematic overview illustrating an example system according to some embodiments.

FIG. 3 is a schematic overview illustrating an example system according to some embodiments. The system 300 is for managing vehicle occupant profiles in a vehicle. Thus, the system 300 may, for example, perform the methods steps of the methods 100 of FIG. 1 and 200 of FIG. 2.

The system 300 comprises an arrangement for managing vehicle occupant profiles in a vehicle 301 comprising at least one transceiver 305 for receiving radio signals wherein a vehicle occupant 302 is associated with at least one unidentified radio device for verification against a vehicle occupant profile.

The radio devices 302a, 302b, 302c may comprise e.g. a mobile communication device 302a, a heart rate monitor 302b, a smart watch 302c associated to a vehicle occupant 302 in a vehicle 301.

The radio devices 302a, 302b, 302c are configured to communicate over any wireless signaling or radio communication technology such as Radio Frequency Identification (RFID), Bluetooth, Wi-Fi, or Near Field Communication (NFC) etc.

The arrangement comprises a memory comprising executable instructions, one or more processors configured to communicate with the memory wherein the one or more processors are configured to cause the arrangement to detect, by the at least one transceiver 305, the at least one unidentified radio device associated with the vehicle occupant 302 and localize, by at least one sensor 303 (seat sensor), 304 (seat belt sensor) in the vehicle 301, the detected at least one unidentified radio device to a seat position 302S in the vehicle 301 occupied by the vehicle occupant 302 of which the detected at least one unidentified radio device is associated with e.g. worn in clothing, hand, wrist or elsewhere on the body.

The one or more processors are further configured to cause the arrangement to update an available vehicle occupant profile of the vehicle occupant 302 with the detected and localized at least one unidentified radio device when other identified radio devices associated to the vehicle occupant are detected and localized to the seat position 302S occupied by the vehicle occupant 302, establish a new vehicle occupant profile of the vehicle occupant with the detected and localized at least one unidentified radio device when no other identified radio devices associated to the vehicle occupant 302 are detected and localized to the seat position 302S occupied by the vehicle occupant 302, and assign a probability value to the updated or established vehicle occupant profile.

In some embodiments, the one or more processors are further configured to cause the arrangement determine the probability value of the vehicle occupant profile based on the number of times a collection of radio devices associated to the vehicle occupant 302 has been detected and localized.

For example, if the collection of radio devices associated to the vehicle occupant 302 has been detected and localized 7 times then a probability value of 0.7 is assigned to the vehicle occupant profile wherein a maximum value is 1 of which value indicates a very high probability that this collection of radio devices associated to the vehicle occupant 302 is accurately identified.

The system 300 comprising the arrangement for managing vehicle occupant profiles in a vehicle may be further comprised in the vehicle 301.

The system 300 may further comprise a vehicle occupant profile system comprising at least one vehicle occupant profile wherein the vehicle occupant profile comprises information regarding a vehicle occupant, at least one identified radio device, and a probability value and wherein the at least one identified radio device makes up a collection or swarm of radio devices associated to the vehicle occupant for verification against the vehicle occupant profile.

Alternatively or additionally, the at least one radio identified device may comprise a plurality of radio devices making up a swarm of radio devices.

The vehicle occupant profile system may further comprise a memory for storing the vehicle occupant profile(s).

Figure 4:
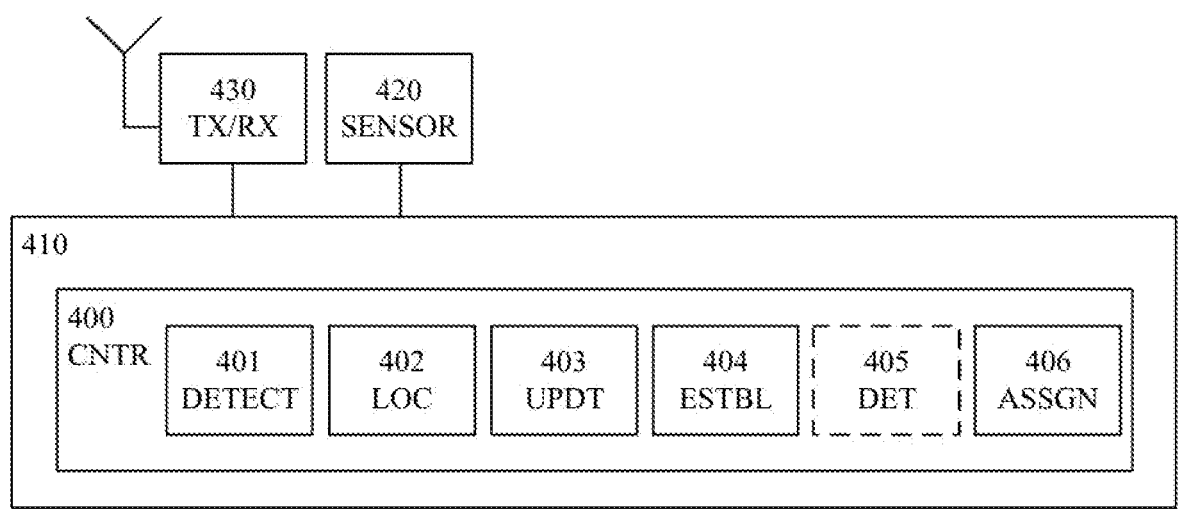
FIG. 4 is a schematic block diagram illustrating an example arrangement according to some embodiments.

FIG. 4 is a schematic block diagram illustrating an example arrangement according to some embodiments. The example arrangement is an arrangement 400 for managing vehicle occupant profiles in a vehicle, wherein the arrangement is configured to be associated with sensor arrangement SENSOR 420, e.g. sensor circuitry, configure to sense a seat position occupied by a vehicle occupant in a vehicle and a transmitting/receiving arrangement TX/RX 430 e.g. transceiver circuitry, configured to transmit and receive radio signals in a vehicle.

The arrangement 400 comprises at least one transceiver for receiving radio signals wherein a vehicle occupant is associated with at least one unidentified radio device for verification against a vehicle occupant profile.

The arrangement 400 comprises a detecting module DETECT 401, e.g. detecting circuitry, configured to detect, by the at least one transceiver, the at least one unidentified radio device associated with the vehicle occupant, and a localizing module LOC 402, e.g. localizing circuitry, configured to localize, by at least one sensor in the vehicle, the detected at least one unidentified radio device to a seat position in the vehicle occupied by the vehicle occupant of which the detected at least one unidentified radio device is associated with.

The arrangement 400 further comprises an updating module UPDT 403, e.g. updating circuitry, configured to update an available vehicle occupant profile of the vehicle occupant with the detected and localized at least one unidentified radio device when other identified radio devices associated to the vehicle occupant are detected and localized to the seat position occupied by the vehicle occupant, an establishing module ESTBL 404, e.g. establishing circuitry, configured to establish a new vehicle occupant profile of the vehicle occupant with the detected and localized at least one unidentified radio device when no other identified radio devices associated to the vehicle occupant are detected and localized to the seat position occupied by the vehicle occupant, and an assigning module ASSGN 406, e.g. assigning circuitry, configured to assign a probability value to the updated or established vehicle occupant profile.

In some embodiments, the arrangement 400 further comprises a determining module DET 405, e.g. determining circuitry, configured to determine the probability value of the vehicle occupant profile based on the number of times a collection of radio devices associated to the vehicle occupant has been detected and localized.

The arrangement 400 may be comprised in the system 300 described in connection with FIG. 3 and/or the arrangement 400 may be configured to perform method steps of any of the methods described in connection with FIGS. 1 and 2.

Figure 5:
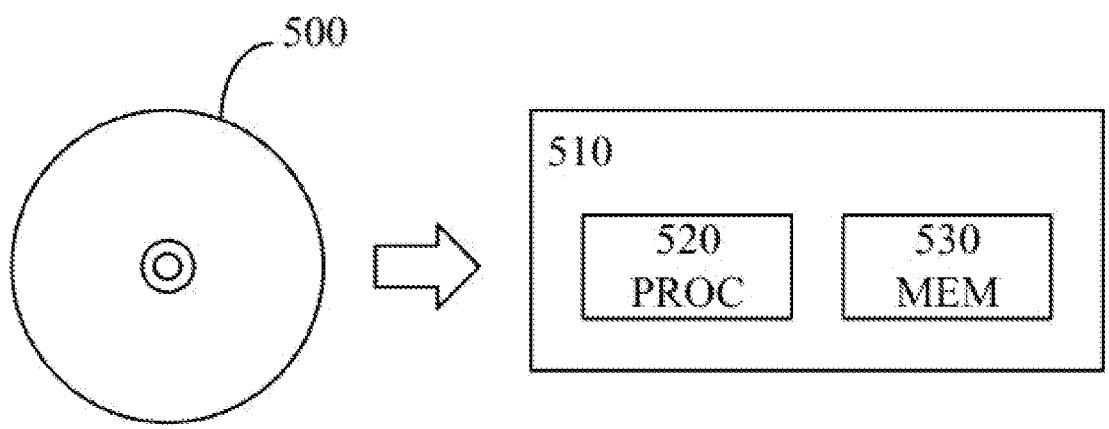
FIG. 5 is a schematic drawing illustrating an example computer readable medium according to some embodiments.

FIG. 5 is a schematic drawing illustrating an example computer readable medium according to some embodiments. The computer program product comprises a non-transitory computer readable medium 500 having thereon a computer program 510 comprising program instructions, wherein the computer program being loadable into a data processing unit and configured to cause execution of the method steps of any of the methods described in connection with FIGS. 1 and 2.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle.

Embodiments may appear within an electronic apparatus (associated with or comprised in a vehicle) comprising arrangements, circuitry, and/or logic according to any of the embodiments described herein. Alternatively or additionally, an electronic apparatus (associated with or comprised in a vehicle) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a vehicle 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIGS. 1 and 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for managing vehicle occupant profiles in a vehicle comprising at least one transceiver for receiving radio signals wherein a vehicle occupant is associated with at least one unidentified radio device for verification against a vehicle occupant profile, the method comprising the following steps:
    detecting, by the at least one transceiver, the at least one unidentified radio device associated with the vehicle occupant,
    localizing, by at least one sensor in the vehicle, the detected at least one unidentified radio device to a seat position in the vehicle occupied by the vehicle occupant of which the detected at least one unidentified radio device is associated with,
    updating an available vehicle occupant profile of the vehicle occupant with the detected and localized at least one unidentified radio device when other identified radio devices associated to the vehicle occupant are detected and localized to the seat position occupied by the vehicle occupant,
    establishing a new vehicle occupant profile of the vehicle occupant with the detected and localized at least one unidentified radio device when no other identified radio devices associated to the vehicle occupant are detected and localized to the seat position occupied by the vehicle occupant, and
    assigning a probability value to the updated or established vehicle occupant profile.

2. The method according to claim 1, further comprising the step of:
    determining the probability value of the vehicle occupant profile based on the number of times a collection of radio devices associated to the vehicle occupant has been detected and localized.

3. The method according to claim 2, wherein the probability value comprises an indication that the collection of radio devices associated to the vehicle occupant is accurately identified.

4. The method according to claim 2, wherein the vehicle occupant profile comprises an authorization level based on the collection of radio devices and/or the probability value assigned to the vehicle occupant profile.

5. The method according to claim 1, wherein the radio device is capable of providing a unique identification signal or wherein the vehicle is capable of distinguishing a signal from the radio device.

6. The method according to claim 1, further comprising updating the available vehicle occupant profile of the vehicle occupant with information of the at least one unidentified radio device when at least one identified radio device of which information is comprised in the vehicle occupant profile also is detected by the at least one transceiver and localized by the at least one sensor in the vehicle.

7. The method according to claim 1, further comprising establishing the vehicle occupant profile of the vehicle occupant with information of the at least unidentified radio device when no other identified radio devices are detected by the at least one transceiver or localized by the at least one sensor in the vehicle.

8. The method according to claim 1, wherein the updating and/or the establishing further comprises requesting a control unit for addition of the detected at least one unidentified radio device to the vehicle occupant profile.

9. The method according to claim 6, further comprising the step of:
    determining a position of the at least one unidentified radio device relative to the vehicle based on signals received by the at least one transceiver.

10. A computer program product comprising a non-transitory computer readable medium, having thereon a computer program comprising program instructions, the computer program being loadable into a data processing unit and configured to cause execution of the method according to claim 1 when the computer program is run by the data processing unit.

11. An arrangement for managing vehicle occupant profiles in a vehicle comprising at least one transceiver for receiving radio signals wherein a vehicle occupant is associated with at least one unidentified radio device for verification against a vehicle occupant profile comprising:
    a memory comprising executable instructions, one or more processors configured to communicate with the memory wherein the one or more processors are configured to cause the arrangement to:
    detect, by the at least one transceiver, the at least one unidentified radio device associated with the vehicle occupant,
    localize, by at least one sensor in the vehicle, the detected at least one unidentified radio device to a seat position in the vehicle occupied by the vehicle occupant of which the detected at least one unidentified radio device is associated with,
    update an available vehicle occupant profile of the vehicle occupant with the detected and localized at least one unidentified radio device when other identified radio devices associated to the vehicle occupant are detected and localized to the seat position occupied by the vehicle occupant,
    establish a new vehicle occupant profile of the vehicle occupant with the detected and localized at least one unidentified radio device when no other identified radio devices associated to the vehicle occupant are detected and localized to the seat position occupied by the vehicle occupant, and
    assign a probability value to the updated or established vehicle occupant profile.

12. The arrangement according to claim 11, wherein the one or more processors are configured to further cause the arrangement to:
    determine the probability value of the vehicle occupant profile based on the number of times a collection of radio devices associated to the vehicle occupant has been detected and localized.

13. The arrangement according to claim 11, further comprising a vehicle occupant profile system comprising at least one vehicle occupant profile wherein the vehicle occupant profile comprises information regarding a vehicle occupant, at least one identified radio device, and a probability value and wherein the at least one identified radio device makes up a collection of radio devices associated to the vehicle occupant for verification against the vehicle occupant profile.

14. A vehicle comprising the arrangement according to claim 11.

15. A system for managing vehicle occupant profiles in a vehicle comprising at least one transceiver for receiving radio signals wherein a vehicle occupant is associated with at least one unidentified radio device for verification against a vehicle occupant profile, comprising:
- a detecting module configured to detect, by the at least one transceiver, the at least one unidentified radio device associated with the vehicle occupant,
- a localizing module configured to localize, by at least one sensor in the vehicle, the detected at least one unidentified radio device to a seat position in the vehicle occupied by the vehicle occupant of which the detected at least one unidentified radio device is associated with,
- an updating module configured to update an available vehicle occupant profile of the vehicle occupant with the detected and localized at least one unidentified radio device when other identified radio devices associated to the vehicle occupant are detected and localized to the seat position occupied by the vehicle occupant,
- an establishing module configured to establish a new vehicle occupant profile of the vehicle occupant with the detected and localized at least one unidentified radio device when no other identified radio devices associated to the vehicle occupant are detected and localized to the seat position occupied by the vehicle occupant, and
- an assigning module configured to assign a probability value to the updated or established vehicle occupant profile.

16. The system according to claim 15, wherein the system further comprises:
- a determining module configured to determine the probability value of the vehicle occupant profile based on the number of times a collection of radio devices associated to the vehicle occupant has been detected and localized.

* * * * *